United States Patent [19]

Howard

[11] Patent Number: 5,085,700
[45] Date of Patent: Feb. 4, 1992

[54] HIGH PURITY, HIGH TEMPERATURE PIPE THREAD SEALANT PASTE

[75] Inventor: Ronald A. Howard, Brook Park, Ohio

[73] Assignee: UCAR Carbon Technology Corporation, Danbury, Conn.

[21] Appl. No.: 608,396

[22] Filed: Nov. 2, 1990

Related U.S. Application Data

[62] Division of Ser. No. 390,730, Aug. 8, 1989, abandoned, which is a division of Ser. No. 187,846, Apr. 29, 1988, Pat. No. 4,872,914.

[51] Int. Cl.$^5$ .......................... C09K 3/10; C09K 3/12; H01B 1/06; F16L 33/18
[52] U.S. Cl. ...................... 106/33; 106/285; 252/22; 252/29; 252/510; 285/80; 285/355
[58] Field of Search ............... 106/36, 285, 33; 252/29, 50, 22, 510; 285/10, 80, 355, 390

[56] References Cited

U.S. PATENT DOCUMENTS

| | | | |
|---|---|---|---|
| 1,594,810 | 8/1926 | Benner | 252/510 |
| 1,636,976 | 7/1927 | Adler | 252/22 |
| 2,270,199 | 1/1942 | Thrune | 106/56 |
| 3,242,075 | 3/1966 | Hunter | 252/22 |
| 3,404,061 | 10/1968 | Shane et al. | 161/125 |
| 3,928,214 | 12/1975 | Naka et al. | 252/11 |
| 4,162,078 | 7/1979 | Cox | 277/102 |
| 4,505,847 | 3/1985 | Jackson | 252/511 |
| 4,585,578 | 4/1986 | Yonahara et al. | 252/511 |
| 4,872,914 | 10/1989 | Howard | 106/285 |

*Primary Examiner*—William R. Dixon, Jr.
*Assistant Examiner*—Michael Marchesch
*Attorney, Agent, or Firm*—Cornelius F. O'Brien

[57] ABSTRACT

A pipe thread sealant paste composition comprising from about 30 to about 80 percent by weight of natural flake graphite particles of a size sufficient to pass through a 100 Tyler mesh sieve and a liquid carrier comprising a mixture of mineral oil and petrolatum, the paste composition preferably having a total ash content of no greater than about 1 percent by weight and containing leachable chlorides in amounts equal to or less than about 50 parts per million. The invention also relates to a method for preparing and applying the pipe thread sealant paste to pipe joints.

9 Claims, No Drawings

HIGH PURITY, HIGH TEMPERATURE PIPE THREAD SEALANT PASTE

This application is a division of prior U.S. application Ser. No. 07/390,730, filing date 8/08/89, now abandoned and/which is a division of application Ser. No. 07,187,846, filing date Apr. 29, 1988, and which is U.S. Pat. No. 4,872,914.

This invention relates to pipe thread sealant pastes having good thermal stability and high purity and also to pipe joints made therefrom. More particularly, this invention relates to an improved high purity, thermally stable, pipe thread sealant paste which can be used in the nuclear power industry.

BACKGROUND OF THE INVENTION

There is a present need for a pipe thread sealant paste that is thermally stable and of high enough purity level to meet the requirements of the nuclear power industry. Most commercially available pipe thread sealant pastes are made from materials that decompose at temperatures which are too low to be useful in "fire-safe" pipe joints required in nuclear power plants. Moreover, these known sealant pastes often contain impurities which may be harmful to metal pipes. Chlorine, for example, is known to cause embrittlement of stainless steel pipes even when present in very small amounts. Other impurities which may be detrimental and harmful include sulfur, fluorides, nitrates, nitrites, zinc, for example, and other embrittling metals.

Graphite is a thermally stable material which has heretofore been used as a filler component in various kinds of lubricants, coatings, cements, packing materials and the like. For example, in U.S. Pat. No. 1,594,810 to Benner et al; there is disclosed a non-corrodible, conductive, thermoplastic coating composition for dry cell electrodes comprising resin, linseed oil, scale wax and powdered graphite. Also, in U.S. Pat. No. 2,270,199 to Thrune, a graphite paste composition useful as a cement for joining solid graphite bodies is disclosed wherein electric furnace graphite powders are blended with a liquid coal tar and a hardening agent which is reactive with the coal tar at elevated temperatures. Similarly, in U.S. Pat. No. 3,928,214 to Naka et al, a lubricating grease for electrical components is disclosed comprising a mineral oil having dispersed therein a high melting wax and a non-volatile solid lubricant such as graphite. None of these prior art references, however, disclose applications where the graphite is employed as a sealant at very high temperatures.

U.S. Pat. No. 4,162,078 to Cox, discloses an injectible packing formulation comprising flexible graphite particles and a liquid lubricant. The flexible graphite particles are prepared by shredding flexible graphite sheet made according to known methods by expanding graphite flakes by a factor of at least 80 times in the "c" crystallographic axis direction, and then compressing the expanded flakes to form a cohesive structure. The shredded flexible graphite particles employed in the packing formulation are fairly large in size varying in length up to about 0.250 inch. The smallest particles used in the formulation are of a size small enough to pass through a 30 U.S. Standard sieve (0.0234 inch). The liquid lubricant used in the formulation may be a synthetic oil such as a silicone fluid and is employed in amounts ranging from about 5 percent by weight to about 35 percent by weight based on the total weight of the flexible graphite and lubricant. Because the flexible graphite particles are thermally stable at elevated temperatures in excess of about 500° F., the packing formulation can be used in many high temperature applications such as steam expansion joints, for example.

It has been proposed to employ as a pipe thread sealant a flexible graphite tape produced under the trade name "Grafoil" by Union Carbide Corporation of Danbury, Conn. This tape is similar to the flexible graphite sheet described in the Cox patent, supra. Although the flexible graphite tape is thermally stable and should be satisfactory for use as a high temperature pipe thread sealant, the tape is relatively thick (approximately 0.006 inch) and cannot be used with stainless steel pipe in small diameters because there is not enough space within the pipe threads to accommodate the relatively thick tape. Also, pipe fitters generally prefer to use a paste because it is a common method of sealing pipe threads.

Pipe thread sealant paste prepared from natural flake graphite particles and a liquid carrier such as linseed oil has some drawbacks. Specifically, the linseed oil may polymerize and thereby harden in use to a point where it is extremely difficult to separate the pipe if required. A more important practical drawback is that it must be stirred before use because the graphite particles tend to settle to the bottom of the suspension. Where high purity sealant applications are required, then a non-contaminated stirrer would have to be used. The use of a contaminated article as a stirrer, could affect the joint seal in some applications.

It is an object of this invention to provide a high purity pipe thread sealant paste.

It is another object of this invention to provide a high purity, high temperature sealant paste that can be packaged in a tube and which can be used from the tube for easy application to the joint of a pipe.

It is another object of this invention to provide a high purity, high temperature sealant paste comprising a substantially homogeneous mixture of natural flake graphite particles with a mineral oil and petrolatum.

SUMMARY OF THE INVENTION

This invention provides an improved pipe thread sealant paste which is thermally stable and has a high enough purity level so that it can be used for sealing stainless steel pipe joints in the nuclear power industry. Specifically, the pipe thread sealant paste composition comprises natural flake graphite particles of a size sufficient to pass through a 100 Tyler mesh sieve and a liquid carrier. The liquid carrier is a mixture of mineral oil and petrolatum. The total amount of leachable chlorides in the paste composition of the invention is less than about 50 parts per million and the ash content is no greater than about 1 weight percent.

As used herein, a mineral oil is an oil obtained from petroleum and has a viscosity of from 50 to 420 SSU (Saybolt seconds Universal) at 100° F., a specific gravity of 0.80 to 0.89 at 60° F., and a flash point of 130° C. to 250° C.

As used herein, petrolatum is a high molecular weight mineral oil having a melting point from 115° F. to 140° F.

DESCRIPTION OF THE PREFERRED EMBODIMENT

Graphite is an allotropic form of the element carbon and is probably best characterized by its good thermal stability at temperatures up to about 2600° Kelvin. It consists of layers of hexagonally arranged carbon atoms in a planar condensed ring system. These layers of hexagonally arranged carbon atoms are substantially flat and are oriented or ordered so as to be substantially parallel and equidistant to one another. The substantially flat, parallel equidistant layers of carbon atoms, usually referred to as basal planes, are linked or bonded together and groups thereof are arranged in crystallites. Some graphites consist of crystallites which are of considerable size and which are highly aligned or oriented with respect to one another. Aside from having a high degree of preferred crystallite orientation, these highly ordered graphites also possess a high degree of purity. Natural flake graphite is a well known highly ordered graphite which is obtained as a mineral. It is generally found in the form of small, soft flakes or powders which exhibit a very high crystal perfection. Occasionally, natural flake graphite may occur as single crystals of graphite. It is relatively easy and inexpensive to obtain commercially; however, some commercial natural flake graphites are often contaminated with other minerals, e.g. chlorides, silicates, nitrates, etc., although the level of these contaminants is usually very low. It should be emphasized that the natural flake graphite that is used in the pipe thread sealant paste of this invention is not an "expanded" natural flake graphite, i.e., graphite which has been subjected to an oxidizing environment at elevated temperatures to expand the graphite as disclosed in the above referred to Cox patent, but rather is a natural flake graphite which is used in its original or naturally occurring state. Moreover, the natural flake graphite employed in the present paste composition has a more finely divided particle size than the "shredded" flexible graphite sheet used in the packing composition of the Cox patent as shall be described hereinafter in greater detail.

The pipe thread sealant paste composition of the invention consists essentially of natural flake graphite particles of a size sufficient to pass through a 100 Tyler mesh sieve and a liquid carrier. The liquid carrier is a mixture of mineral oil and petrolatum. In preparing the liquid carrier the mineral oil and petrolatum are heated to melt the petrolatum, mixed and then the natural flake graphite particles are added and mixed completely into the liquid carrier. The amount of heating required will depend on the particular petrolatum used in preparing the liquid carrier. In most applications, a temperature of 45° C.-55° C. is usually sufficient.

The proportion of natural flake graphite particles and liquid carrier employed in the present paste composition can vary over a relatively wide range depending upon the particular carrier used and its viscosity. The natural flake graphite particles when combined with the liquid carrier should produce a paste composition which has good spreadability so that it will flow quite easily onto and between the pipe threads. The paste composition should not be so fluid, however, that the paste will too easily run off the threads and be lost. Generally speaking, the pipe thread sealant paste composition should contain from about 30 to about 80 percent, preferably about 40 to about 60 percent, by weight of the natural flake graphite particles, the balance of the paste composition being composed essentially of the liquid carrier. In the liquid carrier, the petrolatum should preferably comprise from 5 to 60 percent by weight of the liquid carrier with balance being the mineral oil. More preferably, the petrolatum should be from 20 to 40 percent by weight and most preferably from 25 to 35 percent by weight of the liquid carrier.

The natural flake graphite particles used in the present paste composition should be of a size which is small enough to pass through a 100 Tyler mesh sieve (i.e. approximately 150 microns) as mentioned hereinabove. It has been found that if larger size natural flake graphite particles are used in the paste composition, then the particles will not fill and seal the tiny void spaces that ordinarily exist between the mating thread surfaces that make up the pipe joint.

In a preferred embodiment of the invention, a pipe thread sealant paste is provided which utilizes pure natural flake graphite particles having both a coarse and fine fraction. The pure natural flake graphite used has a carbon content of at least 99.5 weight percent and a leachable chloride content no greater than 50 ppm. The coarse fraction may be composed of the same particle size range mentioned hereinabove, i.e. particles of a size which pass through a 100 Tyler mesh sieve, while the fine fraction may be composed of a more finely divided particle size such as those which pass through a 200 Tyler mesh sieve (approximately 75 microns). Satisfactory pipe thread sealant paste compositions have been made utilizing 50/50 weight percent coarse and fine fractions of the natural flake graphite particles.

Coarser size natural flake graphite particles can also be used in paste compositions for sealing larger diameter pipe joints, for example, pipes having a diameter greater than about 1 inch.

In preparing the pipe thread sealant paste composition of the invention, the coarse and fine fractions of natural flake graphite particles are mixed together with the required amount of liquid carrier in a clean, gentle mixer, such as a Hobart mixer. Any mixer that does not degrade the particle size significantly can of course be used. Mixing is continued for a sufficiently long period of time (e.g., 20 to 30 minutes, for example) to insure that the graphite particles are uniformly distributed throughout the liquid carrier. The ratio of the components can of course be varied in any given instance so as to match the particular thread clearances and to control the spreadability of the paste. The paste should then be placed in tubes, such as the type sold with toothpaste, that can be easily handled and only what is needed can be squeezed out.

The pipe thread sealant paste composition of the invention can be used to make "fire safe" pipe joints for most any type of high temperature application. The paste composition is thermally stable at temperatures up to about 500° C. in an oxidizing atmosphere and up to 3000° C. in a non-oxidizing atmosphere. Ideally, the paste composition can be used to make stainless steel pipe and conduit joints for carrying high pressure steam, control fluids and control wiring in nuclear power plants.

The pipe thread sealant paste composition of the invention, moreover, can be fabricated to meet all the requirements of purity set forth by the nuclear power industry. These requirements are briefly summarized in the following table:

TABLE I

| Impurity | Maximum Permissible Level of Impurities in Pipe Thread Sealant Pastes |
|---|---|
| | Maximum Level* |
| Ash | 1 wt. % |
| Total Chlorides | 500 ppm. |

TABLE I-continued

Maximum Permissible Level of
Impurities in Pipe Thread Sealant Pastes

| Impurity | Maximum Level* |
| --- | --- |
| Leachable Chlorides | 50 ppm. |
| Total Florides | 300 ppm. |
| Total Nitrates | 870 ppm. |
| Total Nitrites | 1 ppm. |
| Total Sulfur | 700 ppm. |
| Total Zinc | 200 ppm. |
| Other Embrittling Metals | 500 ppm. |
| (Silver, Cadmium, Mercury, Galium, Indium, Lead, Tin, Arsenic, Antimony and Bismuth) | (200 ppm. each metal but total below 500 ppm.) |

*Approximate values

Of particular importance, the present paste composition should have an ash content preferably no greater than about 3 percent by weight, more preferably no greater than 1 percent by weight and preferably contains leachable chlorides in amounts equal to or less than about 100 parts per million, more preferably less than 50 parts per million.

The invention will be further illustrated by the following specific example.

EXAMPLE

Pure, natural flake graphite was milled and sized into both a coarse and a fine fraction. The coarse fraction consisted of particles passing through a 100 Tyler mesh sieve but resting on a 200 Tyler mesh sieve while the fine fraction consisted of particles passing through a 200 Tyler mesh sieve. 500 grams of each fraction were then mixed together with 1000 grams of a liquid carrier composed of 300 grams of petrolatum (obtained from Penreco, a division of Penzoil Products Co. under their brand name Petrolatum Penreco Amber) and 700 grams of light mineral oil (obtained from Penreco, a division of Penzoil Products Co. under the brand name Drakeol 9). The oil and petrolatum was heated to 45°-50° C. to melt the petrolatum and then the graphite flakes were added and mixed completely into the liquid carrier. The composition of the paste comprised:

| Material | Percent by Weight |
| --- | --- |
| 100 Tyler Mesh size graphite flakes | 25 |
| 200 Tyler Mesh size graphite flakes | 25 |
| Petrolatum | 15 |
| Mineral Oil | 35 |

The paste composition consisting of these components blended together was then removed from the mixer and placed in a tube. A sample of the paste was then analyzed. It was found that the paste contained less than 1 weight percent ash and had a total chloride content of less than 10 ppm. The total sulphur content of the paste was less than 100 ppm. Zinc was less than 50 ppm, and the total of other embrittling metals was less than 80 ppm.

A threaded pipe joint was made using stainless steel male and female pipe fittings by first cleaning the threads on each pipe and then applying the paste composition thereto from the tube. The paste was spread evenly over the pipe threads taking care to cover all of the threads on each fitting. The male and female fittings were then assembled together under sufficient tightness to insure a permanent pipe joint. The pipe joint was used to carry superheated steam at a pressure of about 1500 psi and showed no evidence of paste decomposition or deterioration. The paste remaining in the tube was sealed using a conventional cap so that the paste could be used again when needed. The remaining paste in the tube was kept clean until it was required for another application.

Accordingly, the example presented is for illustration purposes only and is not intended to unduly limit the reasonable scope of the instant invention.

What is claimed is:

1. A pipe joint comprising a threaded male and female fitting joined together with the threads on each fitting engaging the threads on the other fitting, the threaded engagement between said male and female fitting including void spaces which are substantially filled with a seal paste composition consisting essentially of from about 30 to about 80 percent by weight of natural flake graphite particles of a size sufficient to pass through a 100 Tyler mesh sieve and a liquid carrier comprising petrolatum and mineral oil.

2. The pipe joint according to claim 1 wherein the natural flake graphite particles comprise a coarse fraction consisting of particles of a size which pass through a 100 Tyler mesh sieve and rest on a 200 Tyler mesh sieve and a fine fraction consisting of particles of a size which pass through a 200 Tyler mesh sieve.

3. The pipe joint according to claim 2 wherein the natural flake graphite particles comprise about 50 percent by weight of said coarse fraction and about 50 percent by weight of said fine fraction.

4. The pipe joint according to claim 1 wherein the total ash content is less than about 1 weight percent and the leachable chloride content is less than about 50 parts per million.

5. A pipe joint comprising a threaded male and female fitting joined together with the threads of each fitting engaging the threads on the other fitting, the threaded engagement between said male and female fittings including void spaces which are substantially filled with a paste composition consisting essentially of from about 30 to about 80 percent by weight of natural flake graphite particles, from about 5 to 60 percent by weight petrolatum and the balance mineral oil, said natural flake graphite particles including a coarse fraction and a fine fraction, said coarse fraction comprising particles of a size which pass through a 100 Tyler mesh sieve and rest on a 200 Tyler mesh sieve and said fine fraction comprising particles of a size which pass through a 200 Tyler mesh sieve.

6. The pipe joint according to claim 5 wherein said male and female fittings are composed of stainless steel.

7. A method of forming a pipe joint including threaded male and female fittings in which a pipe sealant is applied to the threads on at least one of said fittings comprising the steps:

(a) heating a mixture of petrolatum and mineral oil to melt the petrolatum and mixing said melted petrolatum and mineral oil together;

(b) adding natural flake graphite particles of a size sufficient to pass through a 100 Tyler mesh sieve to the mixture of step (a) and mixing to form a substantially homogeneous mixture forming a paste composition; and (c) applying the paste to the threads on at least one of said male and female fittings.

8. The method of claim 7 wherein in step (b) the paste composition comprises about 30 to about 80 percent by weight of natural flake graphite particles, from about 5 to 60 percent by weight petrolatum and the balance mineral oil.

9. The method of claims 7 and 8 wherein in step (b) the natural flake graphite particles comprise a course fraction consisting of particles of a size to which pass through a 100 Tyler mesh sieve and rest on a 200 Tyler mesh sieve and a fine fraction consisting of particles of a size which pass through a 200 Tyler mesh sieve.

* * * * *